US012325413B2

(12) United States Patent
Garcia Ramirez et al.

(10) Patent No.: US 12,325,413 B2
(45) Date of Patent: Jun. 10, 2025

(54) VEHICLE AUTOMATED RE-PARKING FOR CABIN TEMPERATURE AND FUEL ECONOMY OPTIMIZATION

(71) Applicant: FORD GLOBAL TECHNOLOGIES, LLC, Dearborn, MI (US)

(72) Inventors: Arturo Alberto Garcia Ramirez, Venustiano Carranza (MX); Jose Emmanuel Ramirez Lluvias, Miguel Hidalgo (MX); Grecia Jimena Reyes Vazquez, Mexico City (MX)

(73) Assignee: Ford Global Technologies, LLC, Dearborn, MI (US)

(*) Notice: Subject to any disclaimer, the term of this patent is extended or adjusted under 35 U.S.C. 154(b) by 359 days.

(21) Appl. No.: 17/942,376

(22) Filed: Sep. 12, 2022

(65) Prior Publication Data
US 2024/0083414 A1 Mar. 14, 2024

(51) Int. Cl.
*B60W 30/00* (2006.01)
*B60W 30/06* (2006.01)
*B60W 50/14* (2020.01)
*B60W 60/00* (2020.01)

(52) U.S. Cl.
CPC ............ *B60W 30/06* (2013.01); *B60W 50/14* (2013.01); *B60W 60/0013* (2020.02); *B60W 2555/20* (2020.02); *B60W 2756/00* (2020.02)

(58) Field of Classification Search
CPC .. B60W 30/06; B60W 60/0013; B60W 50/14; B60W 2756/00; B60W 2555/20
USPC ......................................................... 701/23
See application file for complete search history.

(56) References Cited

U.S. PATENT DOCUMENTS

| 6,298,911 | B1 | 10/2001 | Volz et al. |
| 7,156,168 | B2 | 1/2007 | Gutbrod et al. |
| 8,123,058 | B2 | 2/2012 | Brozell |
| 8,884,784 | B2 | 11/2014 | Kirsch |
| 11,001,231 | B1* | 5/2021 | Hedman ................. G06T 7/593 |
| 2011/0080304 | A1 | 4/2011 | Toledo et al. |
| 2011/0099126 | A1 | 4/2011 | Belani et al. |
| 2018/0194343 | A1* | 7/2018 | Lorenz ................. B60W 30/06 |
| 2019/0202463 | A1* | 7/2019 | Anderson ............. B60W 30/06 |
| 2019/0248243 | A1* | 8/2019 | Gaither ................. B60L 8/003 |

(Continued)

FOREIGN PATENT DOCUMENTS

DE 102010054081 A1 6/2012
WO 9313283 A1 8/1993

*Primary Examiner* — Mahmoud S Ismail
(74) *Attorney, Agent, or Firm* — MacMillan, Sobanski & Todd LLC

(57) ABSTRACT

After a driver parks a vehicle and has left the vehicle, a system relocates the autonomous vehicle into an optimized parking spot. The system obtains availability of other parking spots within a parking lot in which the vehicle is located. The system estimates whether any alternate parking spot would optimize cabin temperature and whether the energy consumed to complete an autonomous relocation of the vehicle will obtain a net savings in fuel economy relative to the energy expended by the relocation. The system determines the benefits of these optimized parking spots by using shaded and unshaded areas, GPS location of the vehicle, current date and time, and weather and fuel consumption estimates. If a favorable parking spot is determined, the autonomous vehicle relocates into the optimal alternate parking spot and informs the driver of the new location.

20 Claims, 6 Drawing Sheets

(56) References Cited

U.S. PATENT DOCUMENTS

2023/0304816 A1* 9/2023 Hegde .................. B60W 40/08
2023/0382392 A1* 11/2023 Roberts ................. G07C 5/008

* cited by examiner

VEHICLE AUTOMATED RE-PARKING FOR CABIN TEMPERATURE AND FUEL ECONOMY OPTIMIZATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to cabin temperature control in vehicles, and more specifically to placement of a vehicle during idle times such that an energy consumption for obtaining a comfortable temperature when a user returns to the vehicle is reduced.

When parked, the orientation and location of a vehicle has energy consequences. For example, tests indicate that cabins of vehicles parked in the Sun during the summer can reach 138 degrees Fahrenheit. A dark-colored dashboard, steering wheel, or seat can reach 200 degrees Fahrenheit, which further warms the air trapped inside a vehicle cabin. A vehicle parked in the shade versus sunlight will heat up less when idle and can then cool down more quickly when needed, providing a more comfortable driving space in less time and conserving energy. The United States Environmental Protection Agency reports that air conditioning in very hot weather can increase fuel consumption 25%. The effect of using air conditioning in a hybrid or electric vehicle can be even greater.

During cold winter weather, an opposite situation exists, namely, that it may be desirable to absorb solar energy. The internal temperature of a vehicle parked in sunlight rather than in shade can naturally increase above the outside ambient temperature, enabling the vehicle to be heated to a comfortable temperature more quickly and efficiently when driving begins. Furthermore, it can minimize or avoid the use of heated seats and steering wheels, also conserving energy.

Thus, when a vehicle is started an interior temperature in the vehicle cabin impacts initial energy consumption because the A/C or heating requirements become greater as the difference in desired temperature from current cabin temperature becomes greater. Achieving a desirable vehicle cabin temperature after it has been parked outside may be responsible for significant energy consumption in the early stages of driving. In addition, a period of occupant discomfort before the desired temperature is reached may be longer when the magnitude of the needed temperature change is larger.

SUMMARY OF THE INVENTION

It has been determined that actions taken while the vehicle is quiescent (e.g., parked) can reduce energy consumption which occurs after the vehicle is started.

One of the highest energy consumption situations involves parking in an unshaded or partially shaded parking lot in the summer Relocating into an alternate parking spot can limit this energy consumption. An optimal spot may be found and then the vehicle may autonomously relocate into it. In an embodiment, the invention determines availability of parking spots and evaluates the potential benefits (e.g., energy savings) and costs (e.g., energy consumption) associated with each alternate parking spot. The interior temperature expected to be maintained at a current parking spot can be measured if there has been sufficient time for the interior to reach equilibrium in the current conditions. In addition, a vehicle cabin temperature induced in the vehicle interior at the current parking spot and for other alternate parking spots can be estimated with an algorithm depending on various factors such as the sizes and angles of the windows, windshield, etc., the parking orientation relative to the sun, the current GPS location of the vehicle (e.g., latitude and longitude), the time of year, the time of day, and an estimate of the length of stay. Current weather conditions such as sunlight, clouds, and precipitation also factor into the estimate of induced vehicle cabin temperature. In some embodiments, an induced vehicle cabin temperature can be empirically determined using characteristic test data compiled for a particular model of vehicle according to a range of solar orientations.

Each of the alternate parking spots nearby a vehicle (e.g., in a current parking lot or along a street where the vehicle is parked) will be evaluated and then compared to the current parking spot. Whether a relocation is executed is based upon a calculation regarding whether the fuel saved resulting from a relocation generates a net savings in fuel taking into account the fuel required to execute the relocation. If more than one alternate spots may provide a net savings, then an optimal parking spot is found among them, and the autonomous vehicle can relocate into the optimal parking spot. A notification may be sent inform the absent driver of the new location.

The invention may utilize estimates of induced vehicle cabin temperature and estimates of corresponding fuel consumption (or other energy consumption, such as a battery charge). The estimates of fuel consumption for a climate control system (such as an HVAC system) can include the energy required to execute an HVAC pulldown in hot weather (or an HVAC buildup in cold weather). An HVAC pulldown comprises the fuel consumed in returning the cabin of the vehicle to a desired cabin temperature in warm weather conditions (an HVAC buildup is the fuel consumed in returning the cabin of a vehicle to a desired cabin temperature in cold weather conditions). A decision whether to relocate may involve factors such as an original HVAC pulldown (or buildup) estimate, a relocated HVAC pulldown (or buildup) estimate, and a relocating fuel consumption estimate among others. An original HVAC pulldown estimate is an estimate of fuel consumption required to perform a pulldown at the time the driver returns to the vehicle, without the system executing a relocation (with the vehicle remaining in its current parking spot). A relocated HVAC pulldown estimate is an estimate of fuel consumption required to perform a pulldown at the time the driver returns to the vehicle, if the vehicle executed a corresponding relocation. The HVAC pulldown estimates are referred to herein as a first energy consumption associated with each respective parking spot. A relocating fuel consumption estimate (referred to herein as a second energy consumption) is an estimate of the fuel consumed by relocating including starting the vehicle, driving to the optimal parking spot, and parking the vehicle into the best calculated orientation.

If a relocating fuel consumption estimate together with a relocated HVAC pulldown estimate, requires more fuel than an original HVAC pulldown estimate, then the vehicle will stay in place without relocating. However, if a relocating fuel consumption estimate together with its relocated HVAC pulldown estimate requires less fuel than an original HVAC pulldown estimate, then the vehicle may relocate to the alternate parking spot. If the vehicle has been relocated to an alternate parking spot, the driver may be notified.

An evaluation of a parking spot may utilize fuel data including the rate of fuel consumption during an HVAC pulldown (or HVAC buildup), a start (e.g., cranking) of the vehicle, and all the energy consumed to a drive to a desired parking spot (e.g., propulsion, steering, braking, etc.). Because the energy necessary to achieve a desired temperature after startup in the winter is provided essentially by engine heat whereas the energy to achieve a desired temperature in the summer utilizes engine horsepower and fuel, the relocating fuel data for winter and summer may be estimated differently. Similarly, different types of estimates would be used when evaluating electrified vehicles or internal combustion vehicles.

In one preferred aspect of the invention, a vehicle apparatus which is configured for relocation into a plurality of orientations at respective azimuth angles has a vehicle cabin providing an interior temperature profile which varies according to a difference between the respective azimuth angle and a solar illumination angle. A climate control system is configured to supply temperature-modified air to the vehicle cabin. A data acquisition system is configured to detect a current vehicle orientation of the vehicle apparatus in a current parking spot, identify shaded areas and unshaded areas in a vicinity of the vehicle apparatus, and identify one or more alternate parking spots to which the vehicle apparatus can be relocated. A controller is configured to (a) estimate induced vehicle cabin temperatures for the current parking spot and for the one or more alternate parking spots based on respective orientations, (b) estimate a first energy consumption of the climate control system for the current parking spot and for the one or more alternate parking spots to achieve a desired vehicle cabin temperature for each respective estimated induced vehicle cabin temperature, (c) estimate a second energy consumption needed to relocate the vehicle apparatus from the current parking spot to each of the one or more alternate parking spots, (d) compare the first energy consumption corresponding to the current parking spot to a sum of the first energy consumption and the second energy consumption for each of the one or more alternate parking spots, and (e) if the one or more alternate parking spots has a corresponding sum less than the first energy consumption of the current parking spot, then transmit a command to relocate the vehicle apparatus accordingly.

DETAILED DESCRIPTION OF PREFERRED EMBODIMENTS

Figure 1:
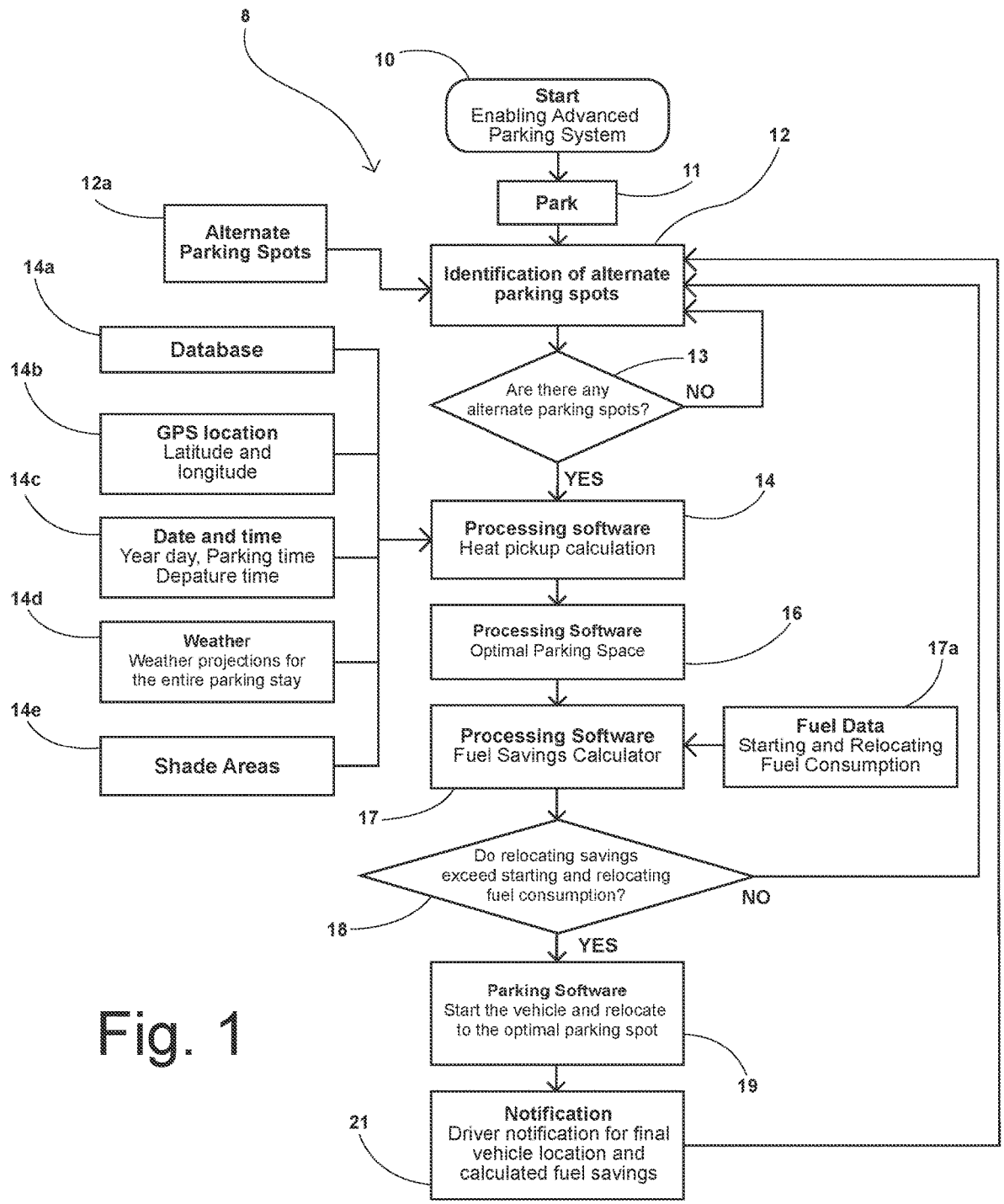
FIG. 1 is a flowchart showing a method of the invention.

FIG. 1 is a flowchart of one preferred method 8 for relocating a vehicle 30 (see FIG. 2) based on energy consumption parameters. In step 10, an advanced parking system is activated by the driver. In step 11, vehicle 30 is parked in a parking spot 34 (e.g., the driver puts a gear selector in a Park position and exits vehicle 30). While the vehicle remains unattended, the cabin temperature will begin to trend toward ambient temperatures which may be undesirable and which could be mitigated by actions to relocate the vehicle. In step 12, alternate parking spots (e.g., spots 12*a* within a predetermined distance or within a common parking lot) are checked for availability. A check is performed in step 13 to determine whether there is alternate parking spot available. If there is no parking spot availability, a return is made to step 12, continuing to seek identification of alternate parking spots, and vehicle 30 remains in place. However, if the decision point exits at YES, then there is parking spot availability. In step 14, a controller (e.g., a controller 70 in FIG. 5) calculates estimates of induced vehicle cabin temperatures in different orientations of vehicle 30 using known relationships, formulas, and stored and currently compiled data. Such stored and current data may include a vehicle profile database 14*a* (including data such as the total area of windows where sunlight can enter), a GPS location 14*b* (e.g., from a GPS sensor providing latitude and longitude data to determine heating and cooling patterns), current date and time data 14*c* (which may include routine arrival and departure patterns of the driver), weather forecast data 14*d* (valid for the duration of the estimated stay), and shade data 14*e* which identifies shaded and unshaded areas of a region around vehicle 30 (e.g., parking lot); all of which may be analyzed and used in the estimate calculations.

In 16, controller 70 inspects the estimates of induced vehicle cabin temperature for the different orientations calculated in step 14 to select an optimized parking spot. An optimal parking spot is defined as the best vehicle position for the lowest estimated induced vehicle cabin temperature in hot weather (or highest estimated induced vehicle cabin temperature in cold weather). In step 17, the controller makes fuel consumption estimates by calculating HVAC fuel costs and relocating fuel cost using known fuel consumption data of the vehicle. In step 18, a check is performed to verify whether the relocating fuel consumption estimate and the relocated HVAC pulldown estimate are less than the original HVAC pulldown estimate. If the relocating fuel consumption estimate to relocate to the optimal parking spot and the relocated HVAC pulldown estimate, are less than the HVAC pulldown estimate of the vehicle in the original parking spot, then the system will initiate the relocation in step 19. The initiation of the relocation comprises starting vehicle 30 followed by an autonomous drive to the optimal parking spot. If the relocating fuel consumption estimate to relocate to the optimal parking spot and a relocated HVAC pulldown estimate, is greater than the HVAC pulldown estimate of vehicle 30 in the original parking spot, then a return is made to step 12 and vehicle 30 remains in place. In step 21, a notification is provided to the driver to inform them of the relocation completion, including the new location of the vehicle. Thereafter, the method may return to step 12.

Figure 2:
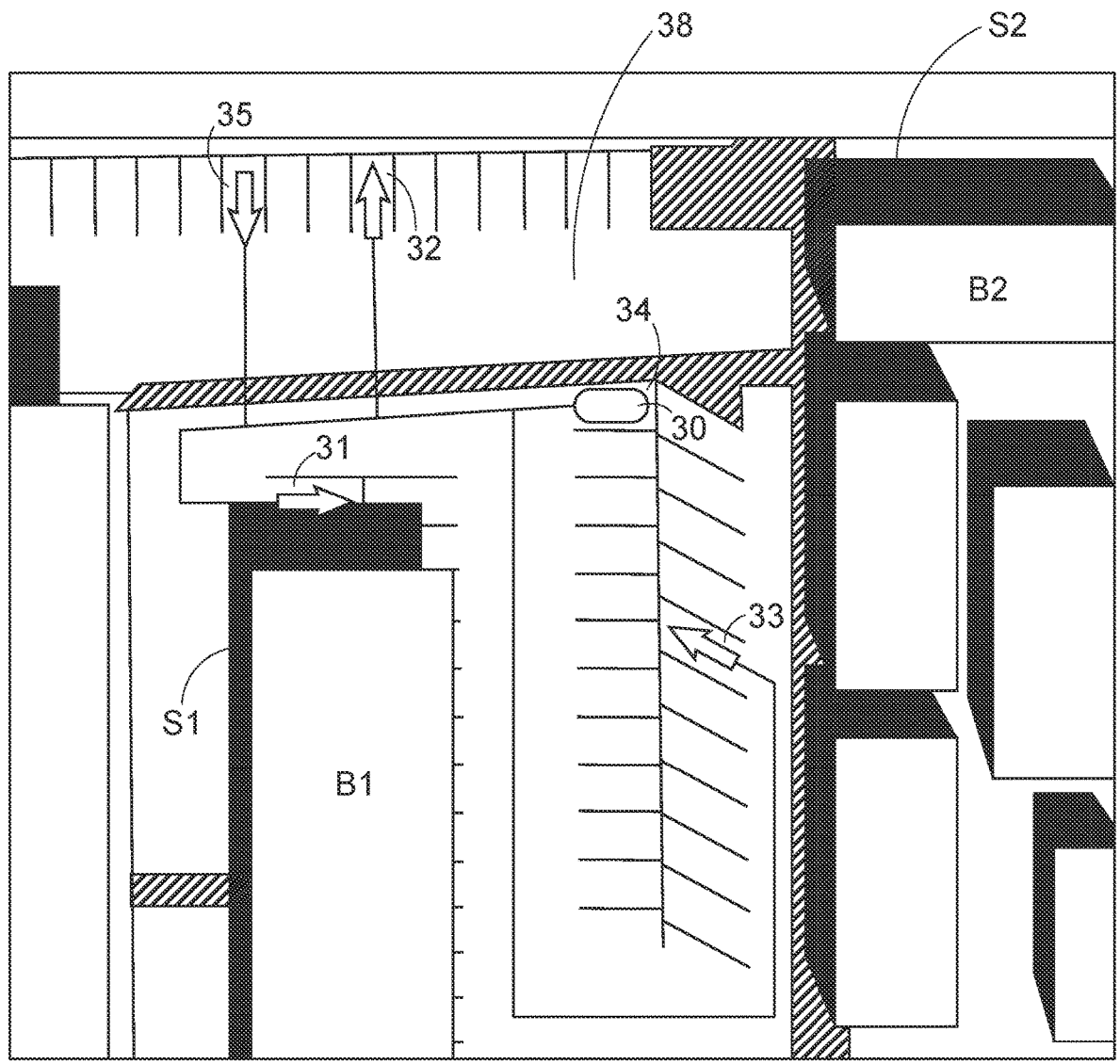
FIG. 2 is a schematic view of a parking lot.

FIG. 2 illustrates vehicle 30 parked in parking spot 34, in a parking lot 38 with other parking spots being occupied or reserved. Those not occupied or reserved are marked by an arrow in the parking spot. The location (latitude and longitude) of parking lot 38, the current date and time, the weather forecast, and the estimated length of parking stay are used to make different fuel consumption estimates at each parking spot that vehicle 30 determines as available.

Each fuel consumption estimate depends on the projected cabin temperature to be reached at the vehicle position and orientation associated with each respective parking spot, which further depends on solar azimuth and any shading of the parking spots.

Alternate parking spots numbered 31 through 35, (including parking spot 34 in which vehicle 30 is currently parked), are in order from a most favorable estimated net fuel consumption (e.g., lowest) to the least favorable estimated net fuel consumption (e.g., highest). The arrows leading from alternate parking spot 34 show the path vehicle 30 would drive in order to park with a front of the vehicle facing the same direction as the tip of the arrow. A Building B1 adjacent parking lot 38 casts a shadowed area S1 which presently falls on parking spots including parking spot 31. Other buildings cast similar shadows, such as a building B2 casting a shadow S2. Alternate parking spot 31 has the most favorable estimated net fuel consumption which is due in part to the alternate parking spot being partially shaded.

Alternate parking spots 31 through 35 may be analyzed for their estimated induced vehicle cabin temperature at the end of one workday, and the resulting HVAC fuel consumptions required to restore vehicle 30 to a desired cabin temperature requested by an occupant are calculated. Alternate parking spot 35 is estimated to have a higher internal cabin temperature after one workday than at current parking spot 34 regardless of what azimuth angle the car is facing. As a result, there will be a higher HVAC fuel consumption in parking spot 35. Therefore, vehicle 30 would lose energy regardless of the fuel consumed to complete the relocation. Assuming a stay in the parking lot of one workday, alternate parking spots 31, 32, and 33, as compared to the current the parking spot 34, are estimated to produce a lower internal cabin temperature and a lower resulting HVAC fuel consumption. However, if vehicle 30 relocated from parking spot 34 to parking spot 33, the estimated fuel consumption required for a relocation would exceed the projected savings, making the estimated net fuel consumption a loss. If parking spot 31 is occupied and therefore does not qualify as an alternate parking spot, a relocation into parking spot 32 may instead occur because the estimated net fuel consumption is the best net savings. However, if both parking spots 31 and 32 are available, a relocation is performed into parking spot 31 as it achieves the greatest net fuel savings, making it the optimal parking spot.

Parking vehicle 30 into parking spot 35 may in this example generate the highest estimate of induced vehicle cabin temperature for all the alternate parking spots after one workday. Backing into parking spot 35 (vehicle 30 facing the direction of the arrow) provides the azimuth angle which would generate the highest estimate of induced vehicle cabin temperature versus any other available orientations/parking spots. During winter, if trying to achieve a highest cabin temperature, then parking spot 35 would be better than the other alternate parking spots. If the vehicle 30 was facing the direction of the arrow, the estimated induced vehicle cabin temperature would be the highest available. However, because the vehicle is required to back in to achieve this estimated induced vehicle cabin temperature, vehicle 30 may have to drive a longer path and for a longer time. Therefore, the relocating fuel consumption estimate would be higher when backing into the parking spot 35. If relocation to parking spot 35 had potential to produce net fuel savings at both parking orientations, then vehicle 30 would be moved according to whichever orientation creates the largest net fuel savings.

Figure 3:
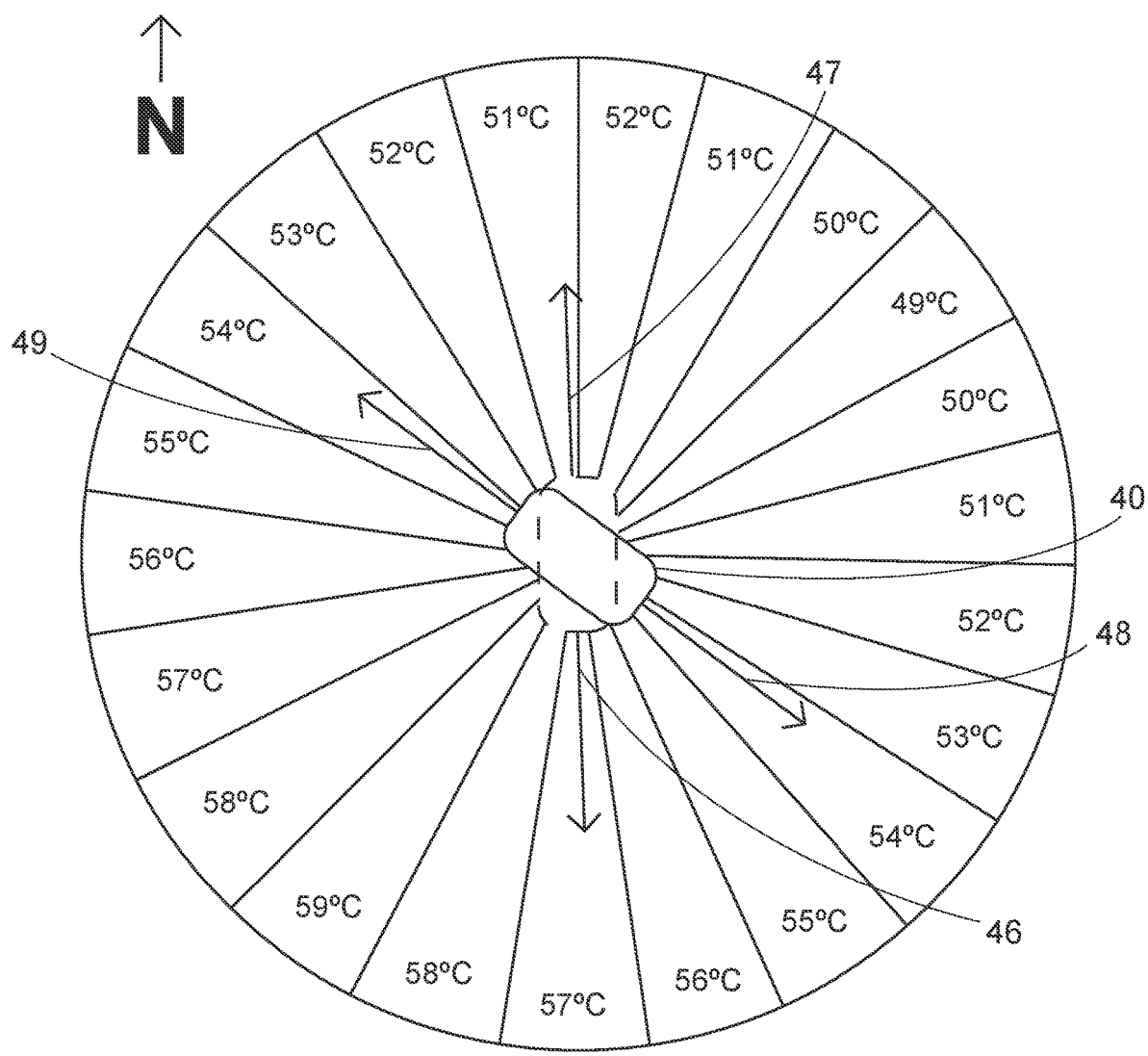
FIG. 3 is a schematic diagram illustrating a relationship between vehicle parking orientation azimuth angle and an estimated temperature induced in the vehicle cabin.

Referring now to FIG. 3, an analysis of estimated induced vehicle cabin temperature in a vehicle 40 parked at an orientation or heading (i.e., vehicle azimuth angle) one workday is illustrated. Vehicle 40, because of location, date, time of day (all of which lead to a corresponding placement of the Sun in the sky in terms of solar azimuth and altitude), and vehicle data (including window sizes), will have different estimated induced vehicle cabin temperature at different orientations. Other factors including weather forecasts or shade also impact the estimated induced vehicle cabin temperature. To the extent that vehicle 40 is parked such that it receives solar illumination, the heating impact on vehicle 40 depends on direction from which the solar illumination arrives. A vehicle manufacturer can characterize the temperature response of a particular vehicle design by placing a prototype vehicle in a sunny location such that the Sun is located at a range of angles relative to the vehicle heading and then measuring the resulting cabin temperatures and storing in a lookup table. In operation, a vehicle can use the lookup table to obtain an estimate of the induced temperature after determining a relative solar azimuth angle using the present vehicle heading and a current solar position identified by the current date and time.

FIG. 3 shows a hypothetical example wherein an original orientation 46 of vehicle 40 is an orientation in which the vehicle was left in an original parking spot by a driver for one workday. An orientation 46 facing a southern direction has an estimated induced vehicle cabin temperature of 57 degrees Celsius after the workday. An orientation 47, reverse of the original parking spot 46, has a much lower estimated induced vehicle cabin temperature of 51 degrees Celsius. However, because of one-way driving paths in the parking lot, the relocating fuel consumption estimate would have been too high to achieve a net fuel savings. While searching for alternate parking spots, an optimal parking spot with an orientation 48 facing the southeast direction may be found with a corresponding induced vehicle cabin temperature of 54 degrees Celsius. The resulting lower cabin temperature (54 degrees Celsius in orientation 48 versus 57 degrees Celsius in orientation 46) significantly reduces the time after the start of the vehicle to reach the desired cabin temperature. As a result, the savings of fuel consumption from HVAC is greater than the energy consumption from the relocation, creating a net fuel savings. An additional, available orientation 49 is shown for the same parking spot but with a reversed heading. Thus, HVAC fuel consumption would be the same. However, the optimal parking spot is in orientation 48 to which vehicle 40 can relocate with the lowest relocating fuel consumption estimate, resulting in the highest net fuel savings.

Figure 4:
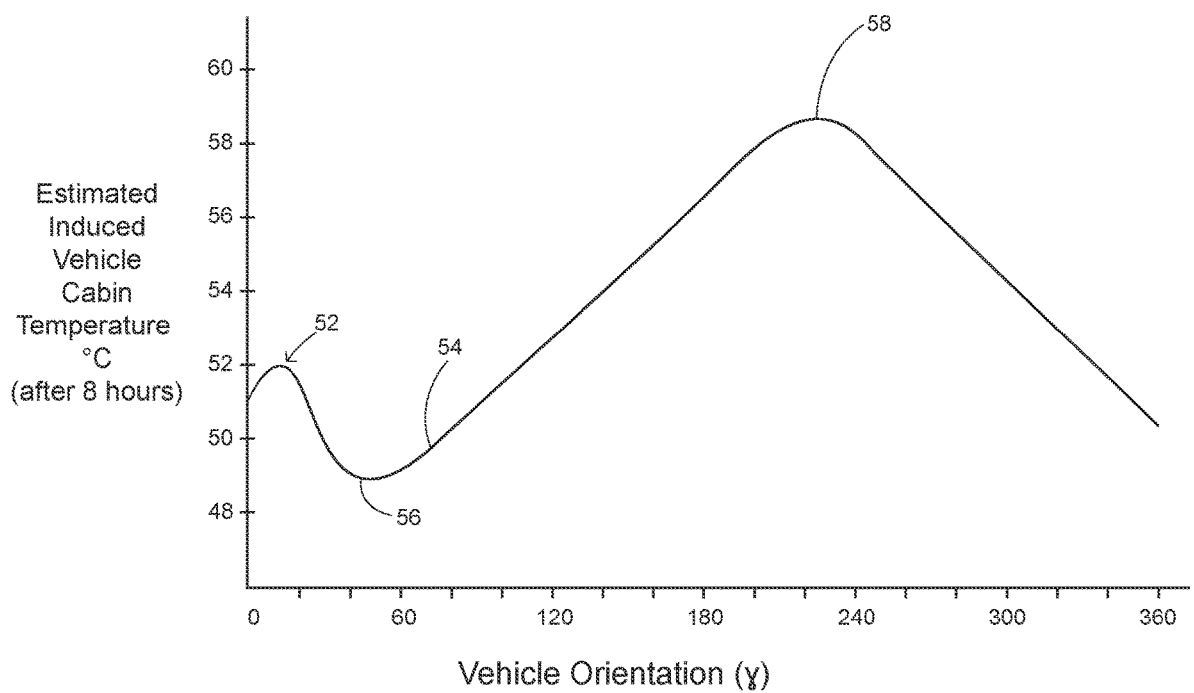
FIG. 4 is an estimated induced vehicle cabin temperature curve collected in advance for respective orientation azimuth angles.

FIG. 4 shows a continuous plot 54 of the variation of estimates of induced vehicle cabin temperatures after one workday in degrees Celsius as measured at respective parking orientations ($\gamma$) seen in FIG. 3. A maximum estimated induced vehicle cabin temperature 58 may occur with the vehicle parked at an orientation that, throughout the workday, experiences the most sunlight shone into the cabin. This may be due to the path of the sun aligning with the parking orientation so that copious sunlight is shone through the windshield or other bigger window on the vehicle. A minimum estimated induced vehicle cabin temperature 56 may occur with the vehicle parked at an orientation that experiences the least sunlight shone into the cabin. This may be due to the path of the sun aligning with the parking orientation so that sunlight shines mostly on windowless parts of the vehicle. There are many factors which create an estimate of induced vehicle cabin temperature which may not be expected. For instance, while the highest estimated induced vehicle cabin temperature may come at a parking orientation where the path of the sun is mostly perpendicular to the windshield, a parking structure or nearby building may create a shadow which results in a much lower estimated induced vehicle cabin temperature. Therefore, azimuth-based temperature estimates may provide a first-order estimate which is modified according to other factors such as weather and shade.

Figure 5:
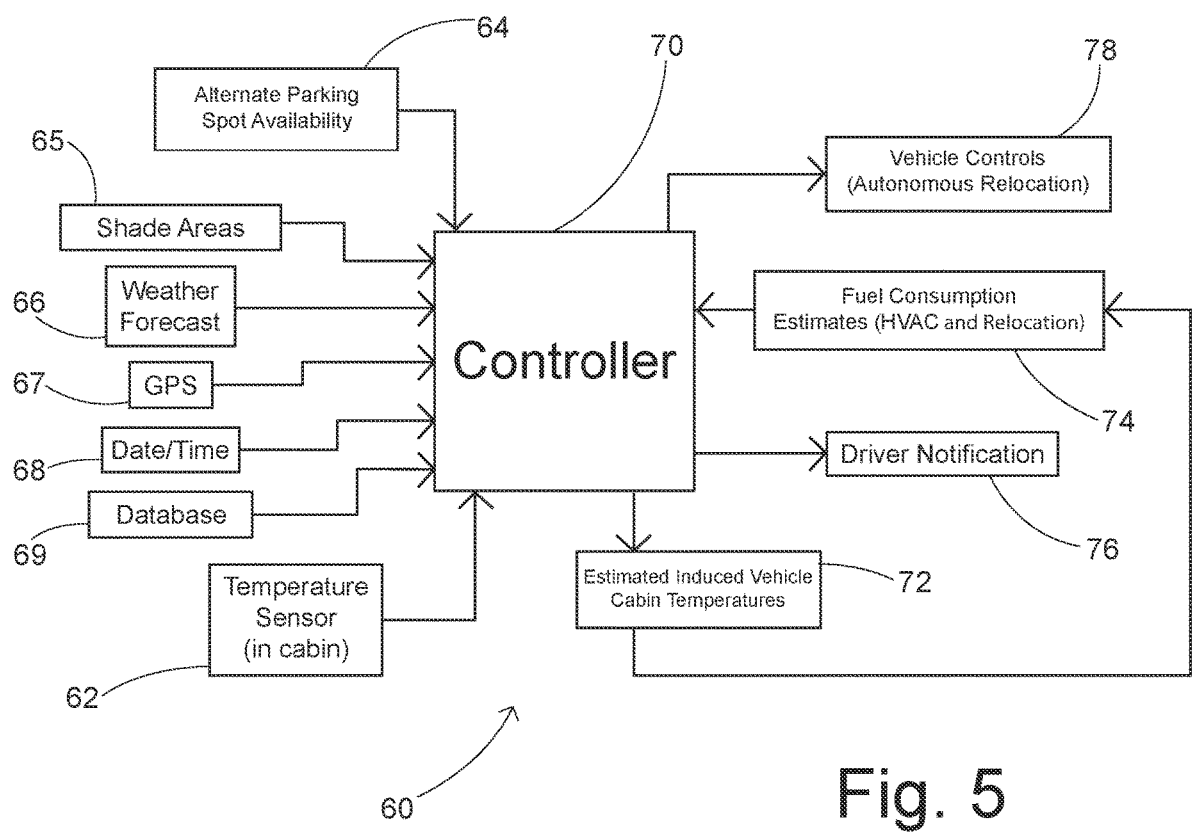
FIG. 5 is a block diagram showing a vehicle according to one preferred embodiment.

FIG. 5 shows one embodiment of a vehicle 60 configured to optimize cabin temperature during parking events for fuel consumption minimization after parking events. Vehicle 60 includes various sensors such as a cabin temperature sensor 62 and external sensors 64. External sensors 64 may include cameras, radar, Lidar, and/or offboard sources which can be utilized to identify nearby parking spots and whether they are available (e.g., unoccupied).

Shade areas 65, weather forecast 66, GPS 67, date and time 68, and vehicle data 69 all provide data to a controller 70. Vehicle 60 receives parking spot availability 64. Controller 70 utilizes data regarding each alternate parking spot to calculate estimates of induced vehicle cabin temperature 72 upon a return to the vehicle 60 by a driver. Induced vehicle cabin temperature estimates are calculated at each angle that the vehicle could park in the alternate parking spots. The estimates of induced vehicle cabin temperature 72 are used to calculate individual estimates of fuel consumption 74 including an estimate of fuel consumption from the HVAC required without a relocation, an estimate of fuel consumption from the HVAC required after a relocation, and an estimate of fuel consumption from a relocation specific to a final angle of the vehicle. Controller 70 uses these estimates of fuel consumption to make the decision whether to relocate the vehicle into each parking spot. If executing a relocation would result in a net savings (compared to staying in place) and that net saving is greater than the net savings from any other parking spot, Controller 70 may be coupled to vehicle controls 78 which will execute the relocation. Vehicle controls 78 may include an autonomous vehicle controller for automatically executing a calibration drive path or relocation to a selected parking orientation or parking spot. After executing any relocation, controller 70 notifies the driver of the change in position using driver notifications 76.

Figure 6:
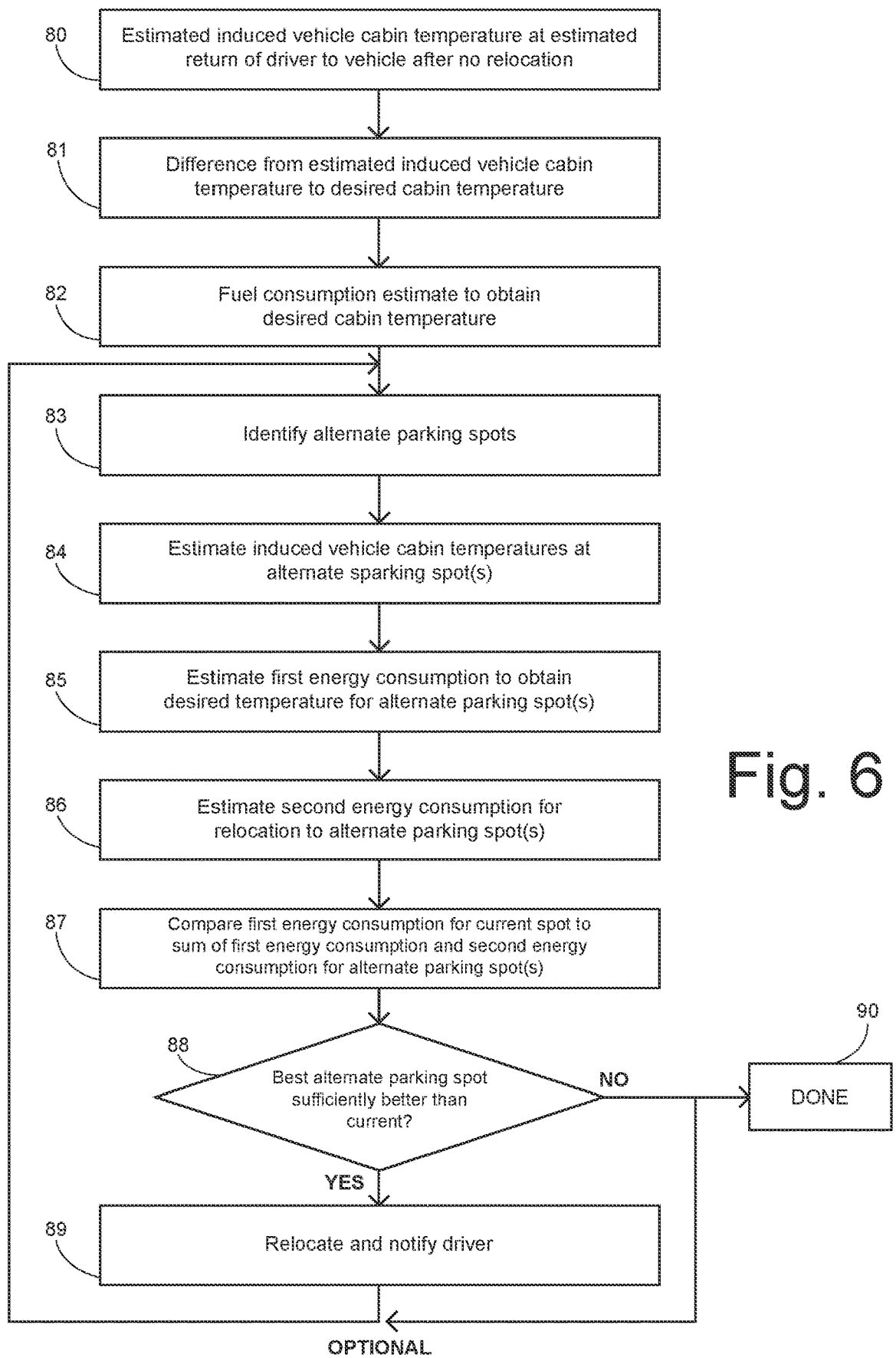
FIG. 6 is a flowchart showing a method of the invention including a parking procedure.

FIG. 6 shows a flowchart describing one preferred method of the invention including a parking procedure. In step 80, a determination is made for the estimate of induced vehicle cabin temperature at the estimated time at which the occupant will return to the vehicle with the vehicle remaining in the current parking spot. In step 81, a determination is made of the difference between the estimated induced vehicle cabin temperature obtained in step 80 and a desired cabin temperature (e.g., a preset temperature that the occupant is attempting to achieve). In step 82, a determination is made for an original HVAC pulldown estimate (or original HVAC buildup estimate). In step 83, potential alternate parking spots are identified. In step 84, a determination is made for the estimate of induced vehicle cabin temperatures at the estimated time the occupant will return to the vehicle at each of the identified alternate parking spots. In step 85, a first energy consumption (relocated HVAC pulldown or buildup estimate) is determined for each of the identified alternate parking spots. In step 86, a second energy consumption for relocating the vehicle is determined for each of the identified alternate parking spots.

In step 87, each sum of a first energy consumption and a second energy consumption of each one of the identified alternate parking spots is compared to the original HVAC pulldown/buildup estimate. In step 88, the largest available energy savings (associated with a best one of the alternate parking spots (e.g., the lowest sum of first and second energy consumption) is examined to determine whether it is sufficiently better than remaining in the current parking spot. For example, it may not be worth it to move the vehicle for a very small energy savings, in view of other complications that may arise from the relocation process. Thus, if the energy savings not sufficiently good enough then the method is complete at step 90. However, if the potential energy savings is above a threshold, then the vehicle may autonomously relocate into the alternate parking spot in step 89, and the driver is notified of the new location of the vehicle. Once the vehicle is relocated and the driver notified, the method may optionally return to step 83, continuing to identify alternate parking spots. After step 89, it is also optional to return to step 83.

What is claimed is:

1. A vehicle apparatus configured for relocation into a plurality of orientations at respective azimuth angles, comprising:
   a vehicle cabin providing an interior temperature profile which varies according to a difference between the respective azimuth angle and a solar illumination angle;
   a climate control system configured to supply temperature-modified air to the vehicle cabin;
   a data acquisition system configured to detect a current vehicle orientation with the vehicle apparatus in a current parking spot and identify one or more alternate parking spots to which the vehicle apparatus can be relocated; and
   a controller configured to:
   (a) estimate induced vehicle cabin temperatures for the current parking spot and for the one or more alternate parking spots based on respective orientations;
   (b) estimate a first energy consumption of the climate control system for the current parking spot and for the one or more alternate parking spots to achieve a desired vehicle cabin temperature for each respective estimated induced vehicle cabin temperature;
   (c) estimate a second energy consumption needed to relocate the vehicle apparatus from the current parking spot to each of the one or more alternate parking spots;
   (d) compare the first energy consumption corresponding to the current parking spot to a sum of the first energy consumption and the second energy consumption for each of the one or more alternate parking spots; and
   (e) if the one or more alternate parking spots has a corresponding sum less than the first energy consumption of the current parking spot, then transmit a command to relocate the vehicle apparatus accordingly to the alternate parking spot having the corresponding sum less than the first energy consumption of the current parking spot.

2. The vehicle apparatus of claim 1 wherein the data acquisition system is configured to identify shaded areas and unshaded areas in a vicinity of the vehicle apparatus altering the estimated induced vehicle cabin temperatures.

3. The vehicle apparatus of claim 1 wherein the controller is configured to select a lowest corresponding sum of the one or more alternate parking spots.

4. The vehicle apparatus of claim 1 wherein the controller is configured to select an alternate parking spot sufficiently better in fuel savings than the current parking spot.

5. The vehicle apparatus of claim 1 wherein the controller is configured to transmit a notification of a new location of the vehicle apparatus to a passenger.

6. The vehicle apparatus of claim 1 wherein the data acquisition system acquires weather projections altering the estimated induced vehicle cabin temperatures.

7. The vehicle apparatus of claim 1 wherein the data acquisition system acquires date and time altering the estimated induced vehicle cabin temperatures.

8. The vehicle apparatus of claim 1 wherein the data acquisition system acquires vehicle data altering the estimated induced vehicle cabin temperatures estimates.

9. The vehicle apparatus of claim 8 wherein vehicle data includes a total area of windows where sunlight can enter.

10. The vehicle apparatus of claim 1 wherein the data acquisition system uses a camera to acquire data.

11. The vehicle apparatus of claim 1 wherein estimates of energy consumption are calculated using fuel data.

12. The vehicle apparatus of claim 11 wherein fuel data includes a rate of fuel consumption of the vehicle apparatus during various vehicle tasks.

13. The vehicle apparatus of claim 12 wherein the various vehicle tasks include climate control system pulldown or buildup.

14. The vehicle apparatus of claim 12 wherein the various vehicle tasks include a start of the vehicle.

15. The vehicle apparatus of claim 12 wherein the various vehicle tasks include driving to an alternate parking spot.

16. A method for operating an autonomous vehicle comprising the steps of:
   detecting a current vehicle orientation with the vehicle in a current parking spot;
   using acquired data to estimate an induced vehicle cabin temperature at an estimated time a driver will operate the vehicle;
   estimating a first energy consumption of a climate control system to achieve a desired vehicle cabin temperature when starting from the estimated induced vehicle cabin temperature;
   identifying one or more alternate parking spots to which the vehicle can be relocated;
   using the acquired data to estimate an induced vehicle cabin temperature for each of the one or more alternate parking spots at the estimated time the driver will operate the vehicle;
   estimating a first energy consumption of the climate control system to achieve a desired vehicle cabin temperature when starting from the estimated induced vehicle cabin temperature of each of the one or more alternate parking spots;
   estimating a second energy consumption needed to relocate the vehicle from the current parking spot to each of the one or more alternate parking spots;
   comparing the first energy consumption corresponding to the current parking spot to a sum of the first energy consumption and the second energy consumption for each of the one or more alternate parking spots; and
   relocating the vehicle to an alternate parking spot if the energy consumption corresponding to the alternate parking spot is less than the energy consumption corresponding to the current parking spot.

17. The method of claim 16 wherein estimated induced vehicle cabin temperatures are altered by weather projections.

18. The method of claim 16 wherein estimated induced vehicle cabin temperatures are altered by date and time.

19. The method of claim 16 wherein estimated induced vehicle cabin temperatures are altered by vehicle data.

20. The method of claim 16 wherein a notification of a new location of the vehicle is transmitted to a user.

* * * * *